United States Patent [19]

Bouldin et al.

[11] Patent Number: 4,692,402
[45] Date of Patent: Sep. 8, 1987

[54] ULTRATHIN OPTICAL RECORDING MEDIUM WITH MOISTURE BARRIER

[75] Inventors: Eric Bouldin, Atherton; Richard Haddock; Christopher J. Dyball, both of Redwood City, all of Calif.

[73] Assignee: Drexler Technology Corporation, Mountain View, Calif.

[21] Appl. No.: 859,116

[22] Filed: May 2, 1986

Related U.S. Application Data

[63] Continuation-in-part of Ser. No. 831,652, Feb. 20, 1986, abandoned.

[51] Int. Cl.$^4$ .................. G01D 9/00; G01D 15/24; B32B 3/00
[52] U.S. Cl. .................. 430/945; 346/135.1; 346/137; 428/209; 428/900
[58] Field of Search ............. 430/945; 346/135.1, 346/137; 428/209, 900

[56] References Cited

U.S. PATENT DOCUMENTS

| | | | |
|---|---|---|---|
| 4,230,939 | 10/1980 | de Bent et al. | 235/488 |
| 4,239,826 | 12/1980 | Knott, II et al. | 428/35 |
| 4,273,815 | 6/1981 | Gifford et al. | 428/35 |
| 4,314,260 | 2/1982 | Drexler | 346/76 L |
| 4,318,970 | 3/1982 | Kurland et al. | 430/2 |
| 4,340,655 | 7/1982 | Hollister et al. | 430/14 |
| 4,360,728 | 11/1982 | Drexler | 235/462 |
| 4,360,820 | 11/1982 | Forster et al. | 346/135.1 |
| 4,383,024 | 5/1983 | Bouldin | 430/271 |
| 4,394,661 | 7/1983 | Peeters | 346/1.1 |
| 4,581,267 | 4/1986 | Miller | 428/40 |
| 4,584,259 | 4/1986 | Mayer et al. | 430/273 |
| 4,606,017 | 8/1986 | Broer et al. | 369/275 |
| 4,607,264 | 8/1986 | Tani et al. | 346/137 |
| 4,616,238 | 10/1986 | Tani et al. | 346/137 |

*Primary Examiner*—John E. Kittle
*Assistant Examiner*—Patrick J. Ryan

[57] ABSTRACT

An optical data storage medium, such as a data card with a strip of optical data storage material, having a thickness approximately that of a credit card and one or more moisture barrier layers. One of the moisture barrier layers is an underlayer between substrate or card base and the storage material, while a second moisture barrier layer is one or more of the transparent laminating sheet and protective layers adhered above the storage material. The barrier layers may be any of the transparent materials, having a maximum moisture vapor transmission rate of 0.1 grams water vapor/100 inch square/mil/24 hours at 38 C and 90% relative humidity, such as polytrichlorofluoroethylene and polyvinylidene chloride. The underlayer may also be a nontransparent aluminum layer.

25 Claims, 5 Drawing Figures

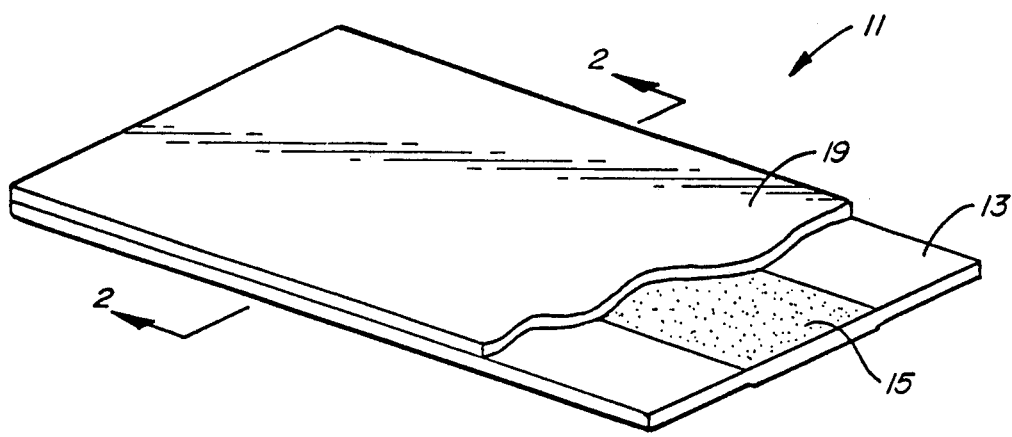
FIG._1.
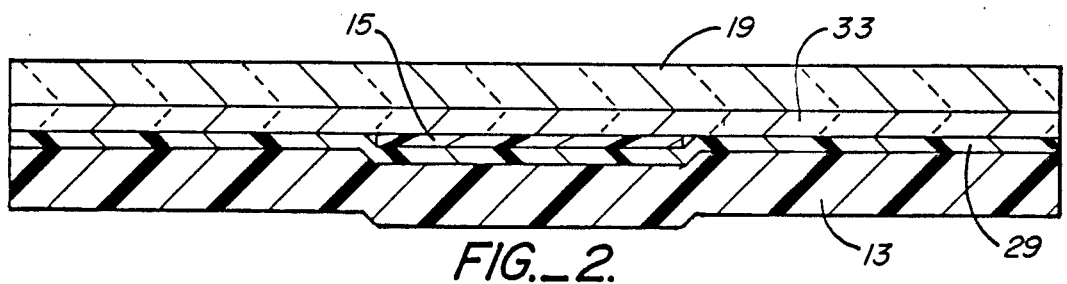
FIG._2.
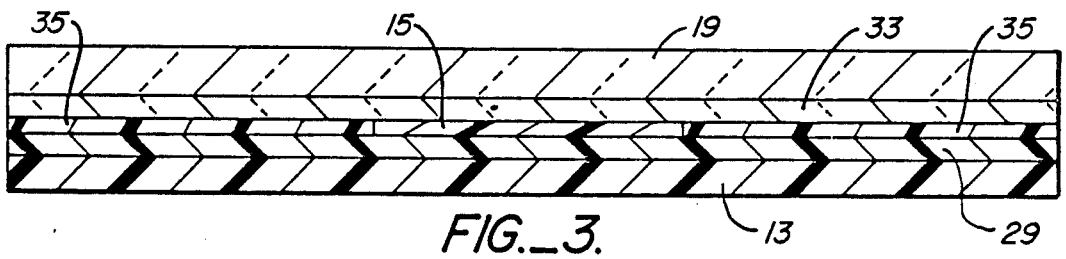
FIG._3.
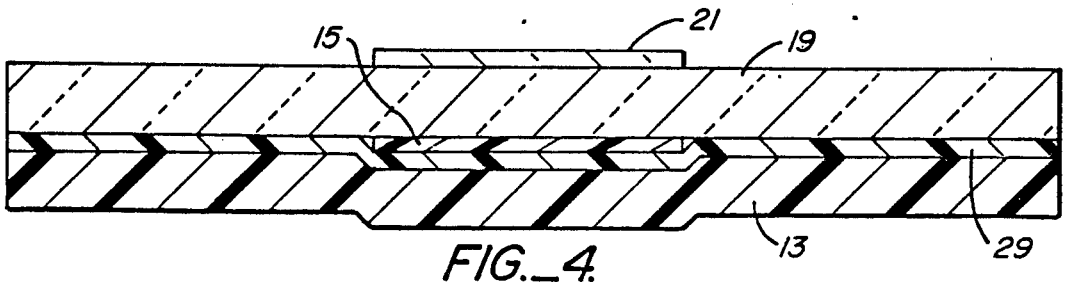
FIG._4.
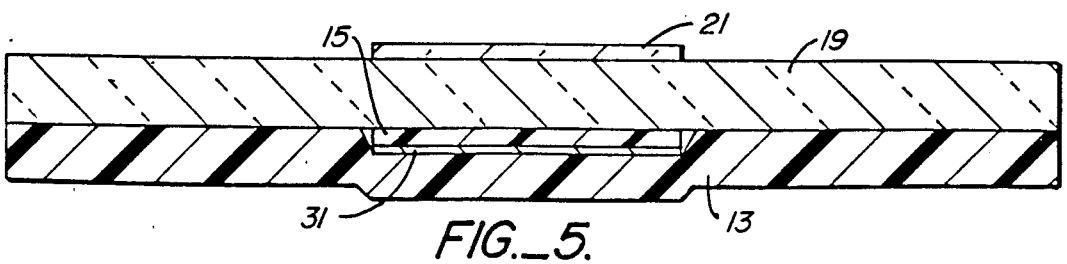
FIG._5.

4,692,402

ULTRATHIN OPTICAL RECORDING MEDIUM WITH MOISTURE BARRIER

CROSS REFERENCE TO RELATED APPLICATION

This application is a continuation-in-part of U.S. patent application Ser. No. 831,652 filed Feb. 20, 1986, now abandoned.

TECHNICAL FIELD

The present invention relates to optical data storage and in particular to optical data cards having one or more hydrophobic protective layers for preventing the degradation of data.

BACKGROUND ART

Optical data storage media typically have scratch resistant protective layers to protect a recording layer from dust and abrasion. U.S. Pat. No. 4,394,661 to Peeters discloses a recording material with a clear resin overcoat. In U.S. Pat. No. 4,360,728 to Drexler, a data card has a thin, transparent plastic sheet laminating material or coating covering a strip of optical recording material. In U.S. Pat. No. 4,360,820, Forster et al. discloses a laser recording medium with a protective polymeric coating deposited over all surfaces of the medium.

In U.S. Pat. No. 4,340,655, Hollister discloses a recording medium in which a recording layer is coated with a transparent thermal and mechanical barrier layer of water-soluble polymer.

The barrier layer is coated with a water-impermeable spacer layer, so that the medium is resistant to the effects of humidity in the environment. The spacer layer may be coated with an antistatic, abrasion resistant layer.

In U.S. Pat. No. 4,318,970, Kurland et al. teach the use of a glass, optically transparent moisture barrier layer between a hydrophobic substrate, such as polycarbonate material, and a hydrophilic photosensitive layer, such as a gelatin based emulsion. The barrier layer prevents diffusion of water from the substrate to the photosensitive layer.

Recording layers based on metal particles in a gelatin matrix are adversely affected by swelling of the gelatin matrix. Such swelling can change the morphology of recording spots or pits, degrading the signal from layer reading and introducing errors. Further, the overall reflectivity of the recording surface may be affected, producing inconsistent read signals from pits written at different times. In conditions of elevated temperature (50° C.) and high humidity (90% relative humidity), signals from recorded data spots may be degraded in as short a time as 16 hours. Other recording media, such as dye-polymer and thin film tellurium based media, are also adversely affected by moisture.

Data disks are typically polymethylmethacrylate polycarbonate or polyethylene terephthalate based with plastic layers at least 40 mils (1 millimeter) thick. Disks are typically used in an office environment, with filtered air and careful handling. By contrast, the total thickness of optical data cards is preferably similar to a credit card thickness of 32 to 34 mils. Small diameter optical disks must also be thin. Cards are also ruggedly treated and subject to dirty environments, being carried about in wallets and pockets. As a result, cards are polycarbonate or polyvinylchloride based and have a base layer only about 15 mils (380 microns) thick. Glass moisture barrier layers as taught by Kurland would be subject to cracking and loss of its barrier properties if used in cards.

The object of the invention is to produce an ultrathin optical data recording and storage medium which is durable over long periods of time, even in humid environments.

DISCLOSURE OF INVENTION

The above object has been met with optical data storage media in which an underlayer of moisture barrier material may be adhered between the storage material and the card base. A transparent laminating sheet over the storage material may be also composed of moisture barrier material, thereby forming a sandwich-like structure which protects the storage material from the effects of moisture. The total thickness of such a structure is on the order of that of a credit card so the medium can be used as a card. The medium can be used for long durations in humid environments without degradation of the optical data storage material. "Optical data storage media" includes laser recorded media, media intended for laser recording, and optically read media that contains, partially or entirely, pre-recorded information written by photolithography, injection molding or other means.

BRIEF DESCRIPTION OF THE DRAWINGS

FIG. 1 is a perspective view of a data card of the present invention.

FIG. 2 is a section view taken along the line 2—2 in FIG. 1.

FIG. 3 is a section view of an alternate embodiment of the card in FIG. 1.

FIG. 4 is a section view of a third embodiment of the card in FIG. 1.

FIG. 5 is a section view of a fourth embodiment of the card in FIG. 1.

BEST MODE OF CARRYING OUT THE INVENTION

With reference to FIG. 1, a data card 11 is illustrated having a size common to most credit cards. The width dimension of such a card is approximately 54 mm and the length dimension is approximately 85 mm. These dimensions are not critical, but preferred because such a size easily fits into a wallet and has historically been adopted as a convenient size for automatic teller machines and the like. The card's base 13 is selected from plastic materials such as polyvinyl chloride, polycarbonate or similar material. Alternate materials include metals such as aluminum.

Base 13 carries strip 15. The strip is between 1 and 54 millimeters (preferably 16 mm or 35 mm) wide and extends the length of the card. Alternatively, the strip may have other sizes and orientations, but should accommodate at least 250,000 bits of binary data. The strip is relatively thin, approximately 100–500 micrometers thick, although this is not critical. The strip may be applied to the card by any convenient method which achieves flatness of the strip. Flatness of the upper surface of the card is also desired. The strip is adhered to the card with an adhesive and covered by a transparent laminating sheet 19 which serves to keep strip 15 flat, as well as protecting the strip from dust and scratches. Since transparent sheet 19 is thicker than base 13 and stiffer than the base, the base tends to have a slight depression below the strip. The base 13, strip 15 and sheet 19 may be unwound from reels and brought together in "sandwich" fashion to form a laminated structure, then trimmed to the desired areawise dimensions. Sheet 19 is a thin, transparent plastic sheet laminating material or coating, such as a transparent lacquer. Sheet 19 typically has a light transmission of at least 75%. The material is preferably made of polycarbonate plastic, approximately 380 micrometers thick. Laminating sheet 19 may also be made of a moisture barrier material. Moisture barriers are described in detail below.

A high resolution optical data storage medium forms strip 15 and may be any optically reflective recording or data storage material, pre-recorded or for future recording by a user, so long as the material can be formed on a thin substrate. An advantage of reflective materials over transmissive materials is that the read/write equipment is all on one side of the card and automatic focus is easier. For example, the high resolution material described in U.S. Pat. No. 4,230,939 issued to de Bont, et al. teaches a thin metallic recording layer of reflective metals such as Bi, Te, In, Sn, Cu, Al, Pt, Au, Rh, As, Sb, Ge, Se, Ga. Materials which are preferred are those having high reflectivity and low melting point, particularly Cd, Sn, Tl, In, Bi, and amalgams.

Suspensions of reflective metal particles in organic colloids also form low melting temperature laser recording media. Silver is one such metal. Preferred recording media are described in U.S. Pat. Nos. 4,314,260, 4,298,684, 4,278,758, 4,278,756, 4,269,917, 4,284,716, 4,312,938, 4,363,870, 4,396,701, 4,383,024, and 4,304,848, all assigned to the assignee of the present invention.

The laser recording material which is selected should be compatible with the laser which is used for writing on it. Some materials are more sensitive than others at certain wavelengths. Good sensitivity to near-infrared light is preferred because near-infrared is affected less by scratches and dirt on the protective layer or laminating sheet. The selected recording material should have a favorable signal-to-noise ratio and form high contrast data bits with the read/write system with which it is used. A large number of highly reflective laser recording materials have been used for optical data disk applications.

The material should not lose data when subjected to temperatures of about 122° F. (50° C.) for long periods. The material should be capable of recording at speeds of at least several thousands bits/sec. This generally precludes the use of materials that require long heating times or that rely on slow chemical reactions in the presence of heat, which may permit recording only a few bits/sec.

Data is recorded by forming spots in the surrounding field of the reflective layer itself, thereby altering the reflectivity in the data spots. Data is read by detecting the optical reflective contrast between the surrounding reflective field of unrecorded areas and the recorded spots. Spot reflectivity of less than half the reflectivity of the surrounding field produces a contrast ratio of at least two to one, which is sufficient contrast for reading. Greater contrast is preferred. Reflectivity of the strip field of about 50% is preferred with reflectivity of a spot in the reflective field being less than 20%, thus creating a contrast ratio of greater than two to one. Alternatively, data may also be recorded by increasing the reflectivity of the strip. For example, the recording laser can melt a field of dull microscopic spikes on the strip to create flat shiny spots. This method is described in SPIE, Vol. 329, Optical Disk Technology (1982), p. 202. A spot reflectivity of more than twice the surrounding field reflectivity produces a contrast ratio of at least two to one, which is sufficient contrast for reading.

With reference to FIGS. 2 and 3, two other embodiments of the card 11 in FIG. 1 comprise a card base 13, strip 15, and laminating sheet 19. The cards in FIGS. 2 and 3 are identical to the card in FIG. 1 described above except that moisture barrier underlayer 29 and moisture barrier transparent overlayer 33 are added below and above the strip respectively. Moisture barrier underlayer 29 and moisture barrier transparent overlayer 33 have widths that approximately equal that of card base 13.

The card in FIG. 3 includes in addition the spacer layer 35, which is incorporated into the card for the advantage of card flatness. The material of the spacer layer may be selected from plastics such as polycarbonate, polyester, polyvinylidene halides, polychlorotrifluoroethylene, or copolymers of these materials. Alternatively, metals such as aluminum may be used.

With reference to FIGS. 4 and 5, two other embodiments of the card 11 in FIG. 1 comprise a card base 13, strip 15, laminating sheet 19 and a removable protective layer 21. The cards in FIGS. 4 and 5 are identical to the card in FIG. 1 described above, except that moisture barrier underlayers 29 and 31, respectively, between the card base or substrate 13 and the strip of recording material 15 are added. Moisture barrier underlayer 29 in FIG. 4 has a width which approximately equals that of card base 13, whereas moisture barrier underlayer 31 in FIG. 5 has a width which approximately equals that of strip 15. Moisture barrier underlayers 29 and 31 are typically about 4 mils (100 micrometers) thick. Removable protective layer 21 is preferably also a moisture barrier in this embodiment. Additional protective layers, not shown but peelable, like those in FIG. 4 may be adhered above layer 21. The total thickness of card 11 should be approximately that of a credit card and in any case should not exceed about 40 mils (1 mm).

Moisture barrier underlayers 29 and 31, as well as laminating sheet 19, removable protective layer 21 and any of the additional protective layers may be made from any of the transparent hydrophobic materials. Polytrichlorofluoroethylene (PTCFE copolymers), which are marketed by Allied Chemical Co. under the trade name "Aclar", the polyvinylidene chloride, or its copolymers, which is marketed by Dow Inc. under the trade name "Saran", are examples of preferred moisture barrier materials which may be used. Underlayers 29 and 31, which are at the back of the recording strip 15 and out of the optical path, may also be made from nontransparent hydrophobic materials, such as metal foils, preferably aluminum foil and metals deposited by known vapor deposition methods, such as aluminum.

The moisture barrier can be laminated as sheets into card 11, or applied to the back side of the strip 15 of recording material and subsequently laminated into the card. The moisture barrier layer may be bonded to card base 13 or the back of strip 15 with an adhesive, as in the case of PTCFE sheets or aluminum foil, applied to the base or strip from a solution or emulsion, as in the case of polyvinylidene chloride, or vapor deposited as in the case of aluminum. The moisture barrier may also be formed in situ by polymerization of an appropriate monomer, or by plasma polymerization of a monomer onto the media surface. Card base 13 may also be made of PTCFE, eliminating the need for moisture barrier layer 29.

The efficacy of moisture barriers is characterized by a moisture vapor transmission rate (MVTR), which describes the amount of water vapor transmitted through a barrier with a particular surface area and thickness during a period of time. Polycarbonate, for example, which constitutes a typical card base has a MVTR of 8 grams water vapor/100 square inches surface/mil thickness/24 hours measured at 38° C. and 90% relative humidity. Moisture barriers of the present invention should have a maximum MVTR of 0.1 g/100 in$^2$/mil/24 hr and preferably an MVTR on the order of 0.02 g/100 in$^2$/mil/24 hr at 38° C. and 99% relative humidity. Cards 11 incorporating 4 mil (100 micron) thick "Aclar" layers in a sandwich-like structure above and below the recording material, when placed in conditions of 50° C. temperatures and 90% relative humidity, are still readable, i.e. recorded data bits still generate good signals, after 300 hours. As mentioned above, signals from recorded bits in cards without moisture barriers degraded in 16 hours.

We claim:

1. An optical data storage medium comprising, a laser recordable data storage material disposed on a substrate, and a transparent, hydrophobic laminating sheet covering said storage material, the substrate, storage material and laminating sheet having a maximum total thickness not exceeding 40 mils.

2. The storage medium of claim 1 further comprising a moisture barrier underlayer beneath said storage material to space apart said substrate and said storage material.

3. The storage medium of claim 2 wherein said moisture barrier underlayer comprises a hydrophobic material having a maximum moisture vapor transmission rate of 0.1 grams water vapor/100 square inches surface /mil thickness/24 hours measured at 38° C. and 90% relative humidity.

4. The storage medium of claim 3 wherein said hydrophobic material of said underlayer is selected from the group consisting of polytrichlorofluoroethylene, or its copolymers, polyvinylidene chloride, or its copolymers, aluminum foil and vapor deposited aluminum.

5. The storage medium of claim 2 wherein said underlayer has a width approximately equal to a width of the substrate.

6. The storage medium of claim 2 wherein said underlayer has a width approximately equal to a width of the storage material.

7. The storage medium of claim 1 wherein said transparent hydrophobic laminating sheet comprises a material having a maximum moisture vapor transmission rate of 0.1 grams water vapor/100 square inches surface/mil thickness/24 hours measured at 38° C. and 90% relative humidity.

8. The storage medium of claim 7 wherein said material of said laminating sheet is selected from the group consisting of polytrichlorofluoroethylene, or its copolymers, and polyvinylidene chloride, or its copolymers.

9. The storage medium of claim 1 wherein said substrate comprises polytrichlorofluoroethylene materials.

10. The storage medium of claim 1 wherein said substrate is a wallet-size plastic card base.

11. The storage medium of claim 1 wherein said laser recordable data storage material comprises a suspension of reflective metal particles in an organic colloid matrix.

12. An ultrathin moisture resistant data card comprising,
a wallet-size plastic card base,
a strip of laser recordable material disposed on said card base, and
a transparent hydrophobic laminating sheet covering said strip, the card base, the strip of laser recordable material and the sheet having a maximum total thickness not exceeding 40 mils.

13. The data card of claim 12 further comprising a moisture barrier underlayer between said card base and said strip.

14. The data card of claim 13 wherein said moisture barrier underlayer comprises a hydrophobic material having a maximum moisture vapor transmission rate of 0.1 grams water vapor /100 square inches surface /mil thickness/ 24 hours measured at 38° C. and 90% relative humidity.

15. The data card of claim 14 wherein said hydrophobic material of said underlayer is selected from the group consisting of polytrichlorofluoroethylene copolymers, polyvinylidene copolymers chloride, aluminum foil and vapor deposited aluminum.

16. The data card of claim 13 wherein said underlayer has a width approximately equal to a width of the card base.

17. The data card of claim 13 wherein said underlayer has a width approximately equal to a width of the strip of laser recordable material.

18. The data card of claim 12 wherein said transparent hydrophobic laminating sheet comprises a material having a maximum moisture vapor, transmission rate of 0.1 grams water vapor /100 square inches surface/mil thicknes/24 hours measured at 38° C. and 90% relative humidity.

19. The data card of claim 18 wherein said material of said laminating sheet is selected from the group consisting of polytrichlorofluoroethylene copolymers and polyvinylidene chloride copolymers.

20. The data card of claim 12 wherein said card base comprises polytrichlorofluoroethylene copolymer material.

21. The data card of claim 12 wherein said strip of laser recordable material comprises a suspension of reflective metal particles in an organic colloid matrix.

22. An optical data storage medium comprising,
a plastic, wallet-size base,
a strip of laser recordable material disposed on said base,
a transparent, hydrophobic laminating sheet covering said laser recordable material, said laminating sheet having a maximum moisture vapor transmission rate of 0.1 grams water vapor/100 square inches surface/mil thickness/24 hours measured at 38° C. and 90% relative humidity, and
a moisture barrier underlayer beneath said laser recordable material to space apart said base and said laser recordable material, said moisture barrier having a maximum moisture vapor transmission rate of 0.1 grams water vapor/100 square inches surface/mil thickness/24 hours measured at 38° C. and 90% relative humidity, said laser recordable material, said base, said laminating sheet and said moisture barrier underlayer having an aggregate thickness of less than 41 mils.

23. The storage medium of claim 22 wherein said underlayer is selected from the group consisting of polytrichlorofluoroethylene, or its copolymers, polyvinylidene chloride, or its copolymers, aluminum foil and vapor deposited aluminum.

24. The storage medium of claim 22 wherein said material of said laminating sheet is selected from the group consisting of polytrichlorofluoroethylene, or its copolymers, and polyvinylidene chloride, or its copolymers.

25. The storage medium of claim 22 wherein said strip of laser recordable material comprises a suspension of reflective metal particles in an organic colloid matrix.

* * * * *

UNITED STATES PATENT AND TRADEMARK OFFICE
CERTIFICATE OF CORRECTION

PATENT NO. : 4,692,402                                Page 1 of 2

DATED      : September 8, 1987

INVENTOR(S) : Eric Bouldin et al.

It is certified that error appears in the above—identified patent and that said Letters Patent is hereby corrected as shown below:

Column 4, line 48, "Polytrichlorofluoroethylene (PTCFE copolymers)" should read - -Polychlorotrifluoroethylene (PCTFE copolymers)-

Column 4, line 64, "PTCFE" should read - -PCTFE- -.

Column 5, line 3, "PTCFE" should read - -PCTFE- -.

Claim 4, column 5, line 46, "polytrichlorofluoroethylene" should read - -polychlorotrifluoroethylene- -.

Claim 8, column 5, line 63, "polytrichlorofluoroethylene" should read - -polychlorotrifluoroethylene- -.

Claim 9, column 5, line 66, "polytrichlorofluoroethylene" should read - -polychlorotrifluoroethylene- -.

Claim 15, column 6, line 24, "polytrichlorofluoroethylene" should read - -polychlorotrifluoroethylene- -.

Claim 19, column 6, line 41, "polytrichlorofluoroethylene" should read - -polychlorotrifluoroethylene- -.

Claim 20, column 6, line 44, "polytrichlorofluoroethylene" should read - -polychlorotrifluoroethylene- -.

Claim 23, column 7, line 3, "polytrichlorofluoroethylene" should read - -polychlorotrifluoroethylene- -.

Claim 24, column 8, line 1, "polytrichlorofluoroethylene" should read - -polychlorotrifluoroethylene- -.

UNITED STATES PATENT AND TRADEMARK OFFICE
CERTIFICATE OF CORRECTION

PATENT NO. : 4,692,402

DATED : September 8, 1987

INVENTOR(S) : Eric Bouldin et al.

It is certified that error appears in the above—identified patent and that said Letters Patent is hereby corrected as shown below:

In the abstract, line 13, "polytrichlorofluoroethylene" should read - -polychlorotrifluoroethylene- -.

Signed and Sealed this

Sixteenth Day of February, 1988

*Attest:*

DONALD J. QUIGG

*Attesting Officer*   *Commissioner of Patents and Trademarks*